United States Patent
Wendt et al.

(10) Patent No.: US 8,698,511 B2
(45) Date of Patent: Apr. 15, 2014

(54) CAPACITIVE OCCUPANT DETECTION SYSTEM WITH INTERFERENCE DETECTION

(75) Inventors: Christoph Wendt, Mettendorf (DE); Darren Khan, Rochester Hills, MI (US); Michael Puetz, Trier (DE); Marc Tonteling, Luxembourg (LU); Gianluca Favalli, Luxembourg (LU)

(73) Assignee: IEE International Electronics & Engineering S.A., Luxembourg (LU)

( * ) Notice: Subject to any disclaimer, the term of this patent is extended or adjusted under 35 U.S.C. 154(b) by 0 days.

(21) Appl. No.: 13/576,190
(22) PCT Filed: Jan. 26, 2011
(86) PCT No.: PCT/EP2011/051074
  § 371 (c)(1),
  (2), (4) Date: Oct. 5, 2012
(87) PCT Pub. No.: WO2011/095420
  PCT Pub. Date: Aug. 11, 2011

(65) Prior Publication Data
  US 2013/0015866 A1    Jan. 17, 2013

(30) Foreign Application Priority Data
  Feb. 4, 2010    (EP) ..................................... 10152678

(51) Int. Cl.
  *G01R 27/26*    (2006.01)
(52) U.S. Cl.
  USPC ........... 324/679; 324/686; 324/663; 324/658; 340/667; 340/562; 701/45
(58) Field of Classification Search
  USPC .......................... 324/679, 686, 663, 658, 688
  See application file for complete search history.

(56) References Cited

U.S. PATENT DOCUMENTS 6,161,070 A    12/2000    Jinno et al.
7,135,983 B2 *  11/2006    Filippov et al. ............... 340/667

(Continued)

FOREIGN PATENT DOCUMENTS

DE    10130771 C1    8/2002
EP    0838697 A2    4/1998

OTHER PUBLICATIONS

International Search Report; International Application No. PCT/EP2011/051074; International Application Filing Date Jan. 26, 2011; Mail date Mar. 2, 2011.
J. R. Smith, "Electric Field Sensing for Graphical Interfaces", IEEE Computer Graphics and Applications; published in Computer Graphics I/O Devices, Issue May/Jun. 1998, pp. 54-60.

(Continued)

*Primary Examiner* — Huy Q Phan
*Assistant Examiner* — Dustin Dickinson
(74) *Attorney, Agent, or Firm* — Cantor Colburn LLP

(57) ABSTRACT

A capacitive occupant detection system (10) comprises a sine signal generator (12) to apply a sine voltage signal to an antenna electrode (14) and a current measurement circuit (18, 20, 28, 30, 40) to measure current signals, based upon which a control and evaluation unit determines and outputs an occupancy state. The signal generator (12) is coupled to the antenna electrode via an amplitude adjustment stage (13), configured to adjust the amplitude of said sine voltage signal applied to said antenna electrode to an amplitude selected among at least two discrete amplitudes. The control and evaluation circuit selects one of the discrete amplitudes at a time and causes the amplitude adjustment stage to adjust the amplitude of said the voltage signal applied to the antenna electrode accordingly. The control and evaluation circuit carries out an interference detection mode and an occupant detection mode. In interference detection mode, the current signals are measured while a low one of the at least two discrete amplitudes is selected and it is determined whether the antenna electrode is exposed to interference. In occupant detection mode, the current signals are measured while a high one of the at least two discrete amplitudes is selected and occupancy state is determined based upon the current signals thus measured.

15 Claims, 5 Drawing Sheets

(56) References Cited

U.S. PATENT DOCUMENTS

2008/0186034 A1 8/2008 Scheckenbach et al.
2009/0164070 A1 6/2009 Yamanaka et al.
2009/0295412 A1 12/2009 Griffin
2011/0133755 A1* 6/2011 Griffin et al. ............ 324/633
2011/0163765 A1* 7/2011 Gray et al. ............ 324/665

OTHER PUBLICATIONS

Written Opinion; International Application No. PCT/EP2011/051074; International Application Filing Date Jan. 26, 2011; Mail date Mar. 2, 2011.

* cited by examiner

CAPACITIVE OCCUPANT DETECTION SYSTEM WITH INTERFERENCE DETECTION

TECHNICAL FIELD

The present invention generally relates to a capacitive occupant detection system, more specifically to such system for detecting the absence or presence of an occupant in or on an occupiable item.

BRIEF DESCRIPTION OF RELATED ART

As used herein, a capacitive occupant detection system refers to a capacitive sensor adapted for detecting the occupancy state of an occupiable item, such as e.g. a cinema seat, a car seat, a hospital bed, a chair, a sofa, etc. A capacitive sensor, called by some electric field sensor or proximity sensor, designates a sensor, which generates a signal responsive to the influence of what is being sensed (a person, a part of a person's body, a pet, an object, etc.) upon an electric field. A capacitive sensor generally comprises at least one antenna electrode, to which is applied an oscillating electric signal and which thereupon emits an electric field into a region of space proximate to the antenna electrode, while the sensor is operating. The sensor comprises at least one sensing electrode—which could comprise the one or more antenna electrodes themselves—at which the influence of an object or living being on the electric field is detected.

The technical paper entitled "Electric Field Sensing for Graphical Interfaces" by J. R. Smith, published in Computer Graphics I/O Devices, Issue May/June 1998, pp 54-60 describes the concept of electric field sensing as used for making non-contact three-dimensional position measurements, and more particularly for sensing the position of a human hand for purposes of providing three dimensional positional inputs to a computer. Within the general concept of capacitive sensing, the author distinguishes between distinct mechanisms he refers to as "loading mode", "shunt mode", and "transmit mode" which correspond to various possible electric current pathways. In the "loading mode", an oscillating voltage signal is applied to a transmit electrode, which builds up an oscillating electric field to ground. The object to be sensed modifies the capacitance between the transmit electrode and ground. In the "shunt mode", an oscillating voltage signal is applied to the transmit electrode, building up an electric field to a receive electrode, and the displacement current induced at the receive electrode is measured, whereby the displacement current may be modified by the body being sensed. In the "transmit mode", the transmit electrode is put in contact with the user's body, which then becomes a transmitter relative to a receiver, either by direct electrical connection or via capacitive coupling. "Shunt mode" is alternatively referred to as "coupling mode".

Capacitive occupant sensing systems have been proposed in great variety, e.g. for controlling the deployment of one or more airbags, such as e.g. a driver airbag, a passenger airbag and/or a side airbag. U.S. Pat. No. 6,161,070, to Jinno et al., relates to a passenger detection system including a single antenna electrode mounted on a surface of a passenger seat in an automobile. An oscillator applies on oscillating voltage signal to the antenna electrode, whereby a minute electric field is produced around the antenna electrode. Jinno proposes detecting the presence or absence of a passenger in the seat based on the amplitude and the phase of the current flowing to the antenna electrode. U.S. Pat. No. 6,392,542, to Stanley, teaches an electric field sensor comprising an electrode mountable within a seat and operatively coupled to a sensing circuit, which applies to the electrode an oscillating or pulsed signal "at most weakly responsive" to wetness of the seat. Stanley proposes to measure phase and amplitude of the current flowing to the electrode to detect an occupied or an empty seat and to compensate for seat wetness.

US 2008/0186034 A1 discloses a capacitive occupant detection system having an oscillator and an electrode operatively coupled to the oscillator, to which the oscillator applies an oscillating voltage signal. In response to the oscillating voltage being applied, an electric current is caused to flow in the electrode, the current being responsive to an electric-field-influencing property of an object or occupant proximate to the electrode. The current caused to flow in the electrode has a first current component in phase with the oscillating voltage signal and a second current component 90°-phase-offset with respect to the oscillating voltage signal. A sensing circuit is operatively coupled to the electrode and to the oscillator so as to generate a first signal indicative of the first current component and a second signal indicative of the second current component. The first signal indicative of the first current component and the second signal indicative of the second current component are provided to a processor, which is operatively coupled to the sensing circuit and which determines an occupancy state based upon the first and second signals indicative of the first and second current components, respectively, and outputs an output signal indicative of the occupancy state.

US application 2009/0295412 A1 addresses the problem that environmental conditions, such as electronic interference, may interfere with the occupant detection system's readings. Electronic noise from electrostatic discharge or a cell phone may cause some occupants to be mischaracterized as adults. In an occupant protection system wherein one or more airbags are enabled or disabled depending on the output of an occupant detection system, electronic interference could, result in one or more airbags being enabled or disabled inappropriately. To solve that problem, US 2009/0295412 A1 discloses an occupant detector that compensates for electronic noise. However, the application remains silent as to how the presence of electronic interference is reliably detected.

BRIEF SUMMARY

The present invention specifically addresses detection of electronic interference in a capacitive occupant detection system.

According to the invention, a capacitive occupant detection system comprises an antenna electrode and a sine signal generator configured to generate a sine voltage signal, the sine signal generator being operatively coupled to the antenna electrode to apply the sine voltage signal to the antenna electrode. When the sine signal voltage is applied to the antenna electrode, the latter radiates an oscillating electric field into its surroundings. The capacitive occupant detection system further comprises a current measurement circuit configured to measure current signals occurring in the antenna electrode or in a separate sensing electrode at the same frequency as the sine signal. The measured current signals may e.g. comprise amplitude (maximum extent of deviation from the mean value of an alternating signal) and phase of the current or a first and a second current component of the current, the first and second current components being out of phase with one another by a phase difference which is not 180° or an integer multiple thereof. If the current measurement circuit is configured to measure the first and second current components, their phase difference is preferably chosen equal to 90°. More preferably the first and second current components are chosen in phase with the sine voltage signal and 90-degrees-phase-offset with respect to the sine voltage signal, respectively. A control and evaluation unit (e.g. a microprocessor) is operatively coupled to the current measurement circuit to determine an occupancy state based upon the measured current signals, and to output an output signal indicative of the occupancy state determined. The sine signal generator is operatively coupled to the antenna electrode via an amplitude adjustment stage, which is configured to adjust the amplitude of the sine voltage signal applied to the antenna electrode to an amplitude selected among at least two discrete amplitudes. The amplitude adjustment stage is operatively connected to the control and evaluation circuit and the control and evaluation circuit is configured to select one of the at least two discrete amplitudes at a time and to cause the amplitude adjustment stage to adjust the amplitude of the sine voltage signal applied to the antenna electrode to the selected amplitude. The control and evaluation circuit is further configured to carry out an interference detection mode and an occupant detection mode. The interference detection mode comprises measuring the current signals while a low one of the at least two discrete amplitudes is selected and determining whether the antenna electrode or the separate sensing electrode is exposed to interference. The occupant detection mode comprises measuring the current signals while a high one of the at least two discrete amplitudes is selected, determining the occupancy state based upon the current signals measured during the occupant detection mode and outputting the output signal indicative of the occupancy state determined. It should be noted that the terms "low" and "high" are used herein to qualify the relationship between the discrete amplitudes of the interference detection mode and the occupant detection mode, respectively. In other words, the discrete amplitude associated to the interference detection mode (the first or the "low" one of the at least two discrete amplitudes) is lower than the discrete amplitude associated to the occupant detection mode (the second or the "high" one of the at least two discrete amplitudes). The first ("low") one of the at least two discrete amplitudes preferably amounts to at most 20%, more preferably at most 10%, yet more preferably at most 5% and still more preferably at most 1%, of the second ("high") one of the at least two discrete amplitudes. According to a preferred embodiment of the invention, the first one of the at least two discrete amplitudes is zero amplitude.

As will be appreciated, the current measurement circuit performs the same frequency-selective current signal measurements during the interference detection mode as during the occupant detection mode. Current signals occurring in the antenna electrode or the separate sensing electrode during the interference detection mode are deemed to result from interference. If a zero-amplitude signal is applied to the antenna electrode during the interference detection mode, this is true in a strict sense, without approximation. As long as the current signals measured during the interference detection mode remain below a certain threshold, the control and evaluation circuit preferably determines that there is no (significant) interference. If these current signals exceed said threshold, however, the control and evaluation circuit preferably determines that there is (significant) interference.

The control and evaluation circuit is preferably configured to carry out the interference detection mode and the occupant detection mode in a temporally interlaced manner and to switch to a disturbed-operation mode when it determines that the antenna electrode is exposed to interference. Preferably, the control and evaluation circuit comprises a memory wherein it stores the occupancy states that it determines.

The control and evaluation circuit may be configured to do at least one of the following while it is operating in the disturbed-operation mode:
 suspending the occupant detection mode;
 outputting an output signal indicative of a default occupancy state;
 outputting an output signal indicative of the most recently determined occupancy state (i.e. the most recent occupancy state determined in the absence of interference);
 outputting an output signal indicative of the presence of interference;
 repeatedly carrying out the interference detection mode and exiting the disturbed-operation mode after it has been determined that the antenna electrode is no longer exposed to interference.

According to a preferred embodiment of the invention, the sine signal generator is a digital sine signal generator, comprising a read-only memory chip having sine waveform samples digitally stored therein, a digital-to-analog converter operatively connected to the read-only memory chip to generate a stepped sine waveform from the sine waveform samples, and a filter (e.g. a lowpass filter) configured to smooth the stepped sine waveform generated by the digital-to-analog converter. Digital sine signal generator preferably comprises a counter operatively coupled to the read-only memory chip to address the latter and cause it to sequentially send the sine waveform samples to the digital-to-analog converter. The digital sine signal generator may receive an external clock signal on a clock signal input node on the counter. Preferably, however, the digital sine signal generator comprises a clock signal generator operatively connected to the counter to provide the counter with a clock signal. Optionally, the control and evaluation unit may be operatively connected to the clock signal generator to modify the clock rate of the clock signal provided to the counter and thereby change the frequency of the applied sine voltage signal.

Most preferably, the capacitive occupant detection comprises a shielding electrode, which the sine signal generator is operatively coupled to for applying the sine voltage signal. The shielding electrode is thus maintained at the same electric potential as the antenna electrode, which cancels the electric field between the antenna electrode and the shielding electrode. The antenna electrode is thereby rendered insensitive in the directions in which it "sees" the shielding electrode. Such configuration is especially useful if the antenna electrode is also used as the sensing electrode, i.e. the electrode on which the current measurements are effected.

An aspect of the present invention concerns a car seat equipped with a capacitive occupant detection system as generally described hereinabove. One or more such car seats may be used in an automotive vehicle equipped with an occupant protection system (e.g. a seat belt reminder and/or an airbag system) responsive to the capacitive occupant detection system.

BRIEF DESCRIPTION OF THE DRAWINGS

Further details and advantages of the present invention will be apparent from the following detailed description of not limiting embodiments with reference to the attached drawings, wherein.

DETAILED DESCRIPTION

Figure 1:
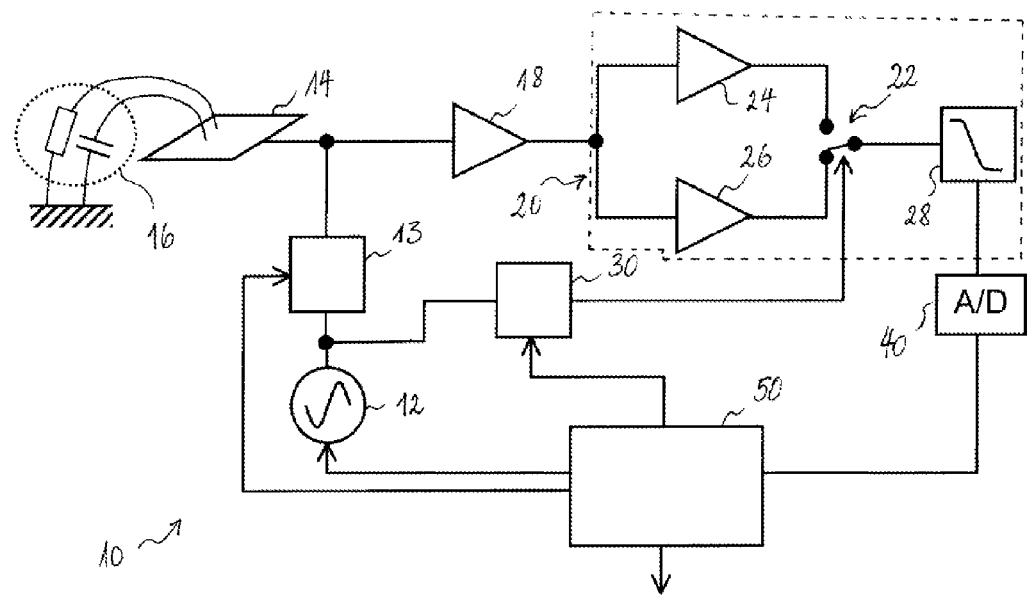
FIG. 1 is a simplified block diagram showing a first embodiment of a loading-mode capacitive occupant detection system.

A simplified circuit of a loading-mode capacitive occupant detection system 10 is illustrated in FIG. 1. A sine signal generator (oscillator 12) applies a sinusoidal voltage signal $V_a$ of a chosen frequency f (e.g. 80 kHz, 100 kHz, 120 kHz or any other frequency in the range from 60 to 250 kHz) to a transmitting and sensing antenna electrode 14. In response to the sine voltage signal $V_a$ being applied to electrode 14, a current having the same frequency of oscillation as the applied sine voltage signal $V_a$ is caused to flow therein. The characteristics of this current depend on the impedance (capacitance and resistance, shown at reference number 16) between the electrode 14 and ground. The impedance and thus the current allow drawing conclusions with respect to the presence or absence of objects or occupants in proximity of the antenna electrode 14, because such objects or occupants change the impedance. The current at frequency f flowing in the electrode 14 can be expressed as a sum of a first current signal which is in phase with the applied oscillating voltage signal and a second current signal which is 90°-phase-offset with respect to the applied oscillating voltage signal. For instance, assuming that the applied voltage signal can be expressed as $V_a(t) = v_0 \cdot \sin(\omega \cdot t)$, t being a time variable, $v_0$ the amplitude of the applied voltage signal and $\omega$ the angular frequency ($\omega = 2\pi f$), the current can be expressed as $I(t) = i_0 \cdot \alpha \cdot \sin(\omega \cdot t) + i_0 \cdot \beta \cdot \cos(\omega \cdot t)$ where $i_0$ is the amplitude of the current and $\alpha$ and $\beta$ coefficients with $\alpha^2 + \beta^2 = 1$. As can be seen, the first term (the first or "in-phase" current component) is in phase with the applied voltage signal, and the second term (the second or "90°-phase-offset" current component) is 90°-phase-offset with respect to the applied voltage signal. The current is thus fully characterized by the pair of measurement values $[i_0\alpha, i_0\beta]$. Those skilled will note that the first current component indicates the resistive part of the impedance 16, whereas the second current component indicates the capacitive part. Alternatively, the current flowing in antenna electrode 14 could be expressed as $I(t) = i_0 \cdot \sin(\omega \cdot t + \phi)$, where $\phi$ is the phase difference between the current and the applied voltage. The current is also fully characterized if one measures the pair of measurement values $[i_0, \phi]$. There is a simple relationship between $[i_0\alpha, i_0\beta]$ and $[i_0, \phi]$.

We will turn now, for sake of illustration, to the particular case of electrode 14 being integrated underneath the surface of a seat. For a dry and empty seat, both in-phase and 90°-phase-offset components of the current are low. If the seat is dry and it becomes occupied by a person, the impedance 16 remains predominantly capacitive in nature but the capacitance increases, which is reflected by an increase of the phase-offset current component with respect to the empty seat situation. If it were ascertained that the seat is always dry, determining only the phase-offset current component could already allow determination of the occupancy state of the seat. However, water present on the seat causes both the capacitive and resistive parts of the impedance to be substantially higher than in case of a dry seat. As a consequence, deciding whether the seat is empty or occupied based solely upon the 90°-phase-offset current component may lead to erroneously detecting an occupant if the seat is empty and wet. Capacitive occupant detection systems therefore advantageously determine the in-phase current component in addition to the phase-offset current component.

As shown in FIG. 1, current-to-voltage converter 18 (e.g. a transimpedance amplifier) converts the current flowing in the sensing electrode 14 into a voltage signal $V_c$, called herein the "converter voltage signal". It may be worthwhile noting that this conversion affects both above-mentioned current components $i_0\alpha$ and $i_0\beta$, which are not yet accessible as separate signals at current-to-voltage converter 18. The converter voltage signal $V_c$ is fed to a clocked rectifier 20 that includes a switch 22, a first branch with an inverting amplifier 24, a second branch with a non-inverting amplifier 26 and a low-pass filter 28. The converter voltage signal is supplied to the inverting amplifier 24 and the non-inverting amplifier 26. The gain of amplifier 24 is opposite to that of amplifier 26 (e.g. −1 and 1, respectively). The outputs of amplifiers 24 and 26 are combined in alternance and fed to the low-pass filter 28 by switch 22.

The switch 22 is controlled by a control circuit 30, which supplies a binary signal, i.e. a signal that can take two values. For the following explanations, reference is made to the timing diagram of FIG. 8. For determining the in-phase current component, the control circuit 30 makes the switch 22 switch to the non-inverting amplifier 26 every time the sine voltage $V_a$ applied to the electrode is positive, i.e. during each positive half-period of sine voltage $V_a$, corresponding to time intervals $TI_1$ in FIG. 8. If the oscillating voltage $V_a$ applied to the electrode is negative, i.e. during each negative half-period of sine voltage $V_a$, corresponding to time intervals $TI_2$ in FIG. 8, control circuit 30 makes the switch 22 switch to inverting amplifier 24. The output signals of the amplifiers 24 and 26 are thus combined into an intermediate signal (the "first" intermediate signal) $V_{i1}$ and input to low-pass filter 28. The voltage signal $V_{o1}$ output in consequence by low-pass-filter 28 corresponds to a time-average of the first intermediate signal $V_{i1}$ and indicates the in-phase component of the current $i_0\alpha$.

Figure 8:
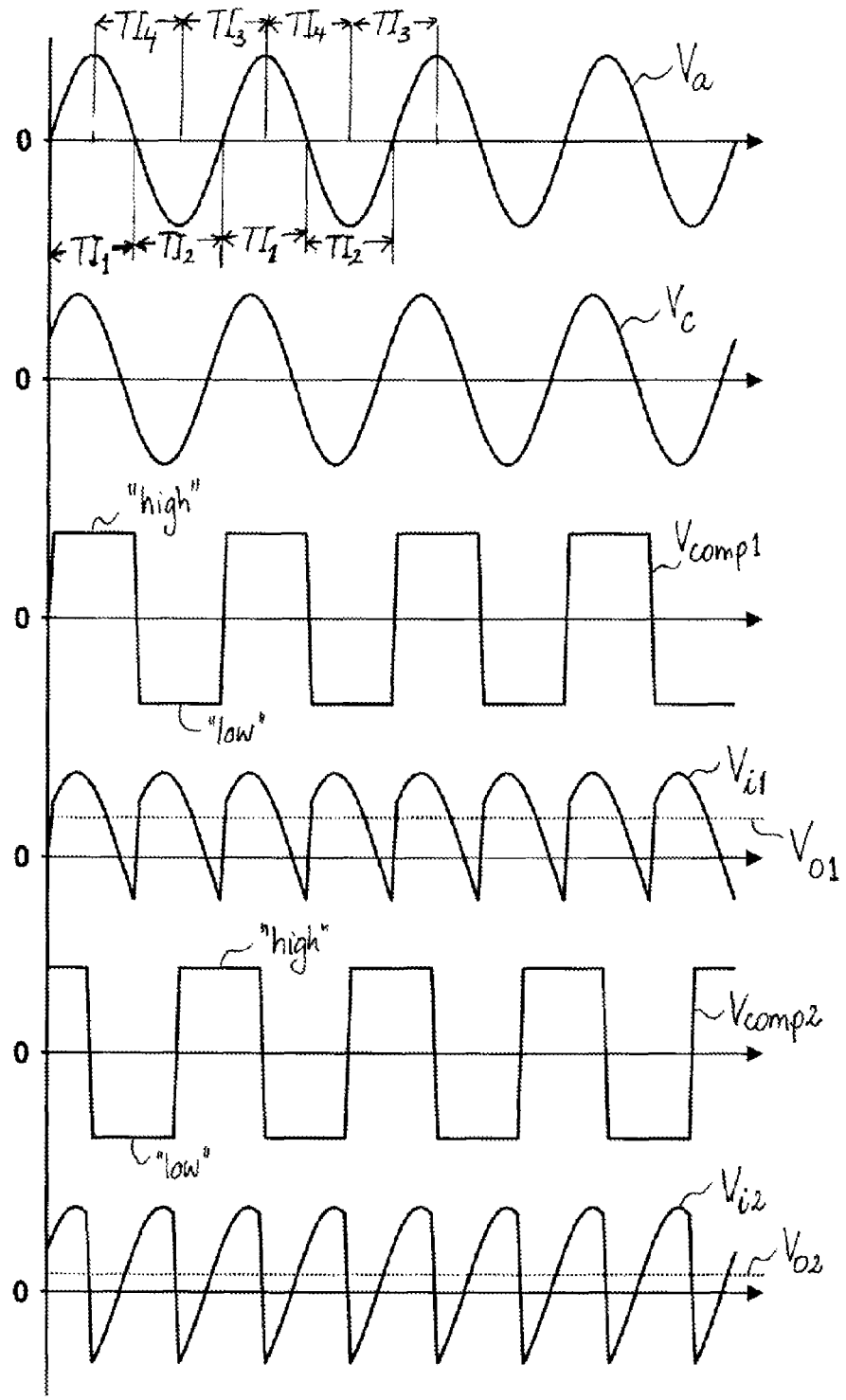
FIG. 8 is a timing chart illustrating the operation of an occupant detection system as illustrated in FIGS. 1 to 7 during occupant detection mode.

For determining the 90°-phase-offset current component, the control circuit 30 makes the switch 22 switch to the non-inverting amplifier 26 every time the oscillating voltage $V_a$ applied to the electrode is on a positive slope, i.e. during the time intervals labeled $TI_3$ in FIG. 8. If the oscillating voltage $V_a$ applied to the electrode is on a negative slope, i.e. during the intervals $TI_4$, control circuit 30 makes the switch 22 switch to inverting amplifier 24. The output signals of the amplifiers 24 and 26 are thus combined into an intermediate signal (the "second" intermediate signal) $V_{i2}$ and input to low-pass filter 28. The voltage signal $V_{o2}$ output in consequence by low-pass-filter 28 corresponds to a time-average of the second intermediate signal and indicates the 90°-phase-offset component of the current $i_o\beta$.

Low-pass filter 28 outputs the signals $V_{o1}$ and $V_{o2}$ indicative of the in-phase and 90°-phase-offset components as analog signals and feeds them to an analog-to-digital converter 40, which, in turn forwards them in digital form to microprocessor 50.

Figure 9:
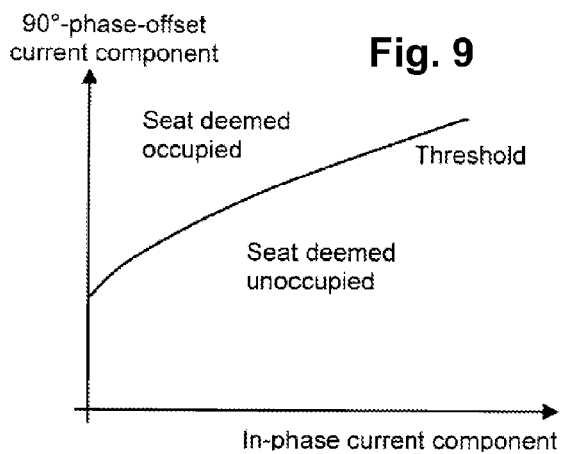
FIG. 9 is a graph representing, as a function of the in-phase current component, the threshold for the 90°-phase-offset current component, above which a seat is recognized as occupied and below which the seat is deemed unoccupied.

Microprocessor 50 may determine the occupancy state based upon the signals indicative of the in-phase current component and the 90°-phase offset current component, respectively. One possible way for the microprocessor to do so is illustrated in FIG. 9. The signal indicative of the 90°-phase-offset current component is compared with a threshold, the threshold being dependent upon the signal indicative of the in-phase current component. FIG. 9 shows a graph representing the threshold for the 90°-phase-offset current component as a function increasing with the in-phase current component. If the 90°-phase-offset current component (indicative of the capacitance) is found to be below the threshold curve for the determined in-phase current component (indicative of the resistance), the seat is deemed "not occupied by a person"; if it is found to be above the threshold for the determined in-phase current component, the seat is deemed "occupied by a person". Depending on the outcome of the determination of the occupancy state, microprocessor 50 issues an output signal communicating the occupancy state to an appliance connected to the capacitive occupant detection system 10, e.g. the control unit of an airbag system or a seat belt reminder. The fact that the threshold for the 90°-phase-offset current component increases with increasing in-phase current component compensates for the above-mentioned wet seat effect. As has been mentioned above, there are other ways by which determination of the occupancy state could be implemented in microprocessor 50.

Electronic interference, e.g. from a cell phone or a laptop computer in the vicinity of the antenna electrode 14 may alter the measured current signals $i_o\alpha$ and $i_o\beta$ and ultimately result in wrongly detecting an occupant or wrongly detecting no occupant. Therefore, the capacitive occupant detection system 10 is configured for reliably detecting electronic interference. Microprocessor 50 controls the system 10 so as to operate alternately in an interference detection mode and in an occupant detection mode. When in occupant detection mode, the microprocessor determines the occupancy state based on the current signal measurements, as described above. When in interference detection mode, the microprocessor 50 determines whether the antenna electrode 14 is exposed to interference.

Capacitive occupant detection system 10 comprises an amplitude adjustment stage 13, which is connected between the oscillator 12 and the antenna electrode 14. The amplitude adjustment stage 13 may be switched between at least two states, each state being associated to a programmed signal amplitude on the output node of the amplitude adjustment stage 13. Amplitude adjustment stage 13 could e.g. comprise an electronically controllable switch that operatively connects the antenna electrode 14 to ground or the oscillator 12, or the amplitude control network of a D/A converter (such as e.g. an R-2R network with adjustable reference voltage). In interference detection mode, the microprocessor 50 keeps the amplitude adjustment stage 13 in a first state, wherein it adjusts the amplitude of the sine voltage signal to a first discrete value equal to 0 or close to 0. In occupant detection mode, microprocessor 50 keeps the amplitude adjustment stage 13 in a second state, wherein it adjusts the amplitude of the sine voltage signal to a second discrete value that is significantly higher than the first value. In both modes, the current measurement circuit operates in the same way, i.e. determines the current components $i_o\alpha$ and $i_o\beta$. If, during the interference detection mode, the current signals exceed a certain noise threshold, microcontroller 50 concludes that there is interference. The noise threshold is chosen such that the low amplitude voltage applied during the interference detection mode does not induce a current that exceeds the threshold in normal circumstances (i.e. in the absence of interference).

If the microcontroller 50 detects interference, it switches to a disturbed-operation mode, wherein it suspends the occupant detection mode and outputs a default occupancy state. The default occupancy state is chosen depending on the application for which the occupant detection system. The default occupancy state could e.g. be the last occupancy state validly determined before the interference was detected. The microcontroller 50 may also output a signal indicative of the presence of interference. When in disturbed-operation mode, the microcontroller 50 repeatedly carries out the interference detection mode (e.g. at regular time intervals) and stays in disturbed-operation mode as long as the interference persists. If microcontroller 50 no longer detects the interference, it exits the disturbed-operation mode and operates normally again.

Figure 10:
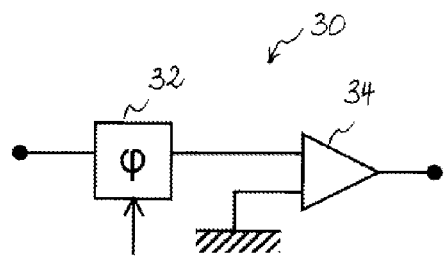
FIG. 10 is a schematic of an embodiment of a detail of the circuits represented in FIGS. 1, 3, 4, 6 and 7.

Occupant detection system 10 determines in-phase and phase-offset current components in alternance. Indeed, when the in-phase current component is determined, switch 22 switches at those points in time at which the oscillating voltage $V_a$ applied to the antenna electrode 14 has a zero crossing. In contrast, when the 90°-phase-offset current component is determined, the switch 22 switches at those points in time at which the oscillating voltage $V_a$ applied to the electrode 14 has a maximum or a minimum. As shown in FIG. 10, the control circuit 30 may e.g. comprise a phase shifter receiving the sine voltage signal from the oscillator 12 and a comparator. The comparator compares the output of phase shifter with a reference voltage corresponding to the mean value (DC component) of the sine voltage signal output by oscillator 12. If the output of the phase shifter 32 is at a potential higher than the reference voltage, the comparator outputs a "high" signal to switch 22. If the output of the phase shifter 32 is at a potential lower than the reference voltage, the comparator outputs a "low" signal to switch 22. If the in-phase component of the current is to be determined, the phase shifter forwards the oscillator signal substantially without an additional phase shift. As a result, the output of the comparator is "high" during the first time intervals $TI_1$ and "low" during the second time intervals $TI_2$ (see curve labeled $V_{comp1}$ in FIG. 8). If the 90°-phase-offset component of the current is to be determined, the phase shifter forwards the oscillator signal with an additional phase shift of substantially 90°. As a result, the output of the comparator is "high" during the third time intervals $TI_3$ and "low" during the fourth time intervals $TI_4$ (see curve labeled $V_{comp2}$ in FIG. 8). It should be noted that the "high" and "low" outputs of comparator 34 are not necessarily opposed to one another, as shown in FIG. 8. The "low" output could e.g. be situated at ground potential. The additional phase shift provided by the phase shifter may be controlled by the microprocessor 50. The latter may, in particular, provide a clock signal to phase shifter, which determines the frequency of the alternance between determining the in-phase current component and determining the 90°-phase-offset current component. As the control circuit 30 is connected to the output node of oscillator 12 it receives a non-zero amplitude signal to synchronize on also during the interference detection mode.

Figure 2:
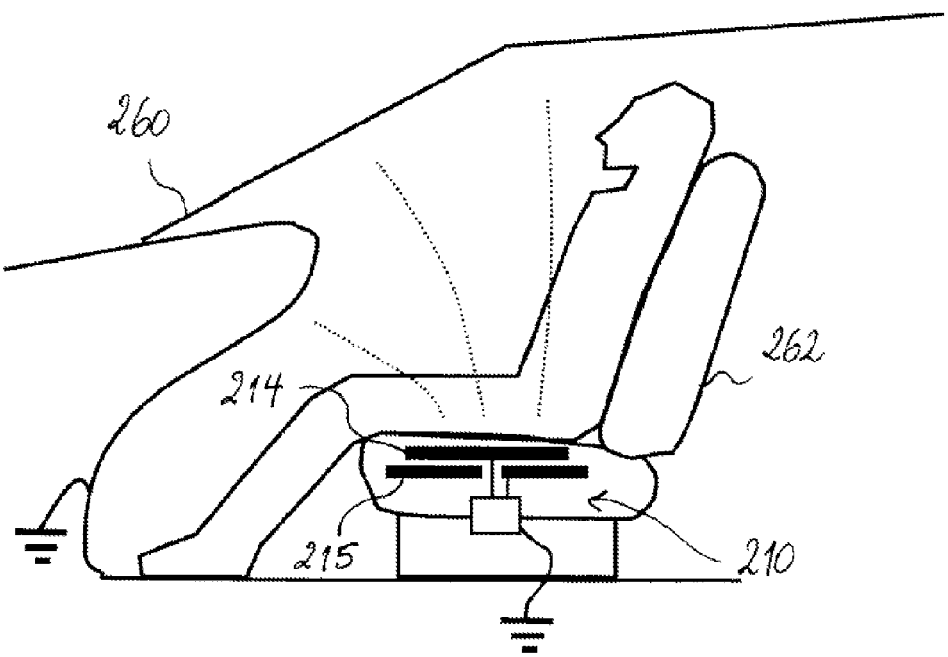
FIG. 2 is a schematic view of an automobile equipped with a vehicle seat having therein a loading-mode capacitive occupant detection system according to a second embodiment.
Figure 3:
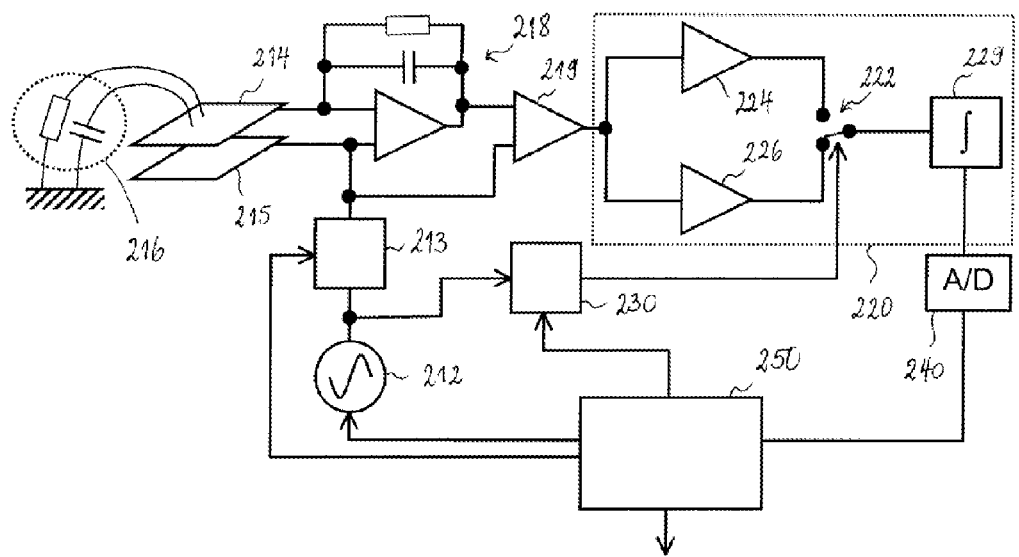
FIG. 3 is a simplified block diagram of the capacitive occupant detection system shown in FIG. 2.

FIG. 2 schematically shows an automotive vehicle 260 with a car seat 262 equipped with a loading-mode capacitive occupant detection system 210, which is explained in more detail with respect to FIG. 3. Oscillator 212 applies a sine voltage signal $V_a$ of a chosen frequency f (e.g. 80 kHz, 100 kHz, 120 kHz or any other frequency in the range from 60 to 250 kHz) to the shielding electrode 215 and to the transmitting and sensing antenna electrode 214. Shielding electrode 215 is connected to the output of oscillator 212 via amplitude adjustment stage 213. Current-to-voltage converter 218 maintains the sensing electrode 214 at substantially the same electric potential as the shielding electrode. The characteristics of the current flowing in the sensing electrode depend on the impedance 216 between sensing electrode 214 and ground. The advantage of providing a shielding electrode 215 is that the sensitivity of the sensing electrode 214 can be directed into a specific direction, e.g. towards a region that an occupant normally occupies.

A difference amplifier 219 amplifies the potential difference between the output pin of signal current-to-voltage converter 218 and the output of oscillator 212, this potential difference being indicative of the current flowing in the sensing electrode. In this case, the signal output by the difference amplifier 219 is considered as the converter voltage signal $V_c$. The converter voltage signal $V_c$ is fed to a clocked rectifier 220 that includes an electronically controlled switch 222, an amplifier circuit (having a first branch with an inverting amplifier 224 and a second branch with a non-inverting amplifier 226) and an integrator 229. The converter voltage signal $V_c$ is supplied to the inverting amplifier 224 and the non-inverting amplifier 226. The gain of amplifier 224 is opposite to that of amplifier 226 (e.g. −1 and 1, respectively). The outputs and of amplifiers 224 and 226 are combined in alternance and fed to integrator 229 by switch 222.

The switch 222 is controlled by control circuit 230, which operates as the control circuit 30 described in detail with reference to FIG. 1. As will be appreciated, integrator 229 integrates the first and second intermediate voltage signals $V_{i1}$, $V_{i2}$ that intervene in clocked rectifier 220. Those skilled will note that integrating a signal for a given period of time enables one to determine the average of the signal during the given period. The integration time being known, signals output as time integrals are thus at least as meaningful as the corresponding time-averaged signals. Integrator 229 thus outputs signals indicative of the in-phase and 90°-phase-offset components as analog signals and feeds them to an analog-to-digital converter 240, which, in turn forwards them in digital form to microprocessor 250. Microprocessor 250 thereupon determines an occupancy state. Integrator 229 could be replaced by a low-pass filter as shown e.g. at reference number 28 in FIG. 1.

Microprocessor 250 operates in the way described in detail for microprocessor 50 of FIG. 1. In particular, microprocessor 250 interacts with amplitude adjustment stage 213 in the same way as microprocessor 50 interacts with amplitude adjustment stage 13.

The network applying the sine voltage signal to the shielding electrode 215 and the antenna electrode 214 (oscillator 212, amplitude adjustment stage 213 and current-to-voltage converter 218) and the current measurement circuit (comprising difference amplifier 219, clocked rectifier 220, control circuit 230 and analog-to-digital converter 240) are preferably integrated together in an application-specific integrated circuit (ASIC) or a programmable embedded system-on-chip (integrating configurable analog and digital functions, memory and a microcontroller on a single chip), as available e.g. from Cypress under the trademark "PSoC". The microprocessor 250 preferably communicates with the ASIC or programmable embedded system-on-chip (or the relevant components thereof) via a communication interface, e.g. a serial interface. A further communication interface is provided on the microcontroller 250 to enable it to communicate the occupancy state to an occupant protection system (e.g. the airbag deployment system or the seat belt reminder of vehicle 260).

Figure 4:
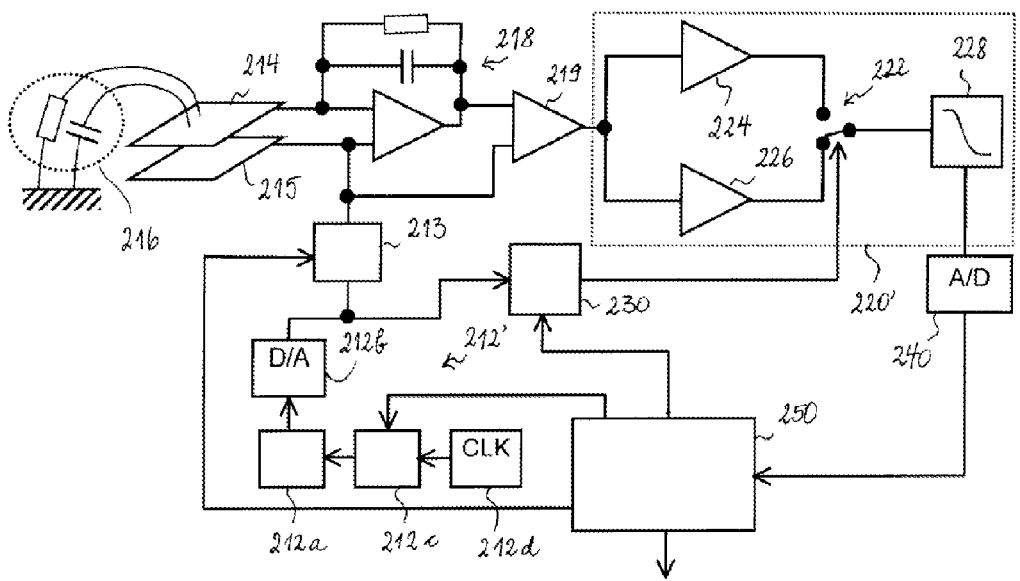
FIG. 4 is a simplified block diagram of a variant of the system of FIG. 3.

FIG. 4 shows a variant of the capacitive occupant detection system of FIG. 3. For sake of conciseness, the same reference numbers have been used and only the differences with respect to the system of FIG. 3 are detailed in the following. Therefore, unless otherwise stated, the variant of FIG. 4 has the same features and operates in the same way as the capacitive occupant detection system of FIG. 3.

Clocked rectifier 220' comprises a low-pass filter 228 to time-average the first and second intermediate signals $V_{i1}$ and $V_{i2}$.

Oscillator 212' is implemented as a digital sine signal generator, comprising a read-only memory chip 212a having sine waveform samples digitally stored therein, a digital-to-analog converter (DAC) 212b (e.g. an R-2R ladder DAC or a DAC of any other suitable type) connected to the output node of read-only memory chip 212a to generate a stepped sine waveform from the sine waveform samples. A counter 212c is connected to the read-only memory chip 212a (e.g. an EPROM or an EEPROM) to address the registers thereof according to a predefined sequence. The counter 212c receives a reference clock signal from reference clock (e.g. a crystal or SAW oscillator). The stepped sine waveform output by DAC converter 212b is smoothed by a reconstruction lowpass filter (not shown). Microprocessor 250 controls the counting rate of the counter 212c and thereby the frequency f of the generated sine voltage signal.

Figure 5:
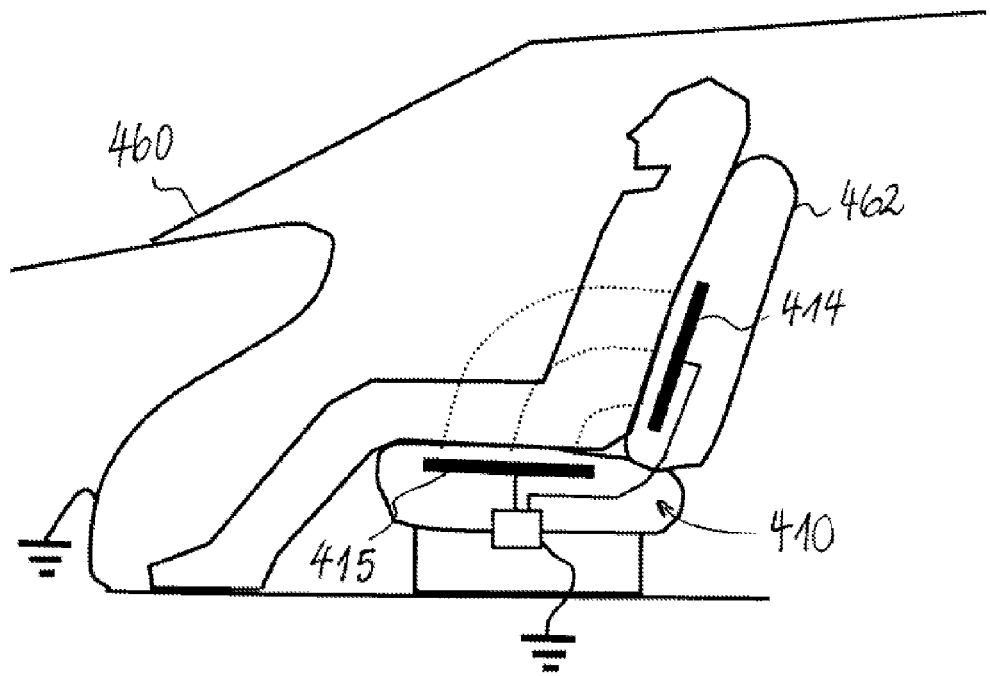
FIG. 5 is a schematic view of an automobile equipped with a vehicle seat having therein a coupling-mode capacitive occupant detection system.
Figure 6:
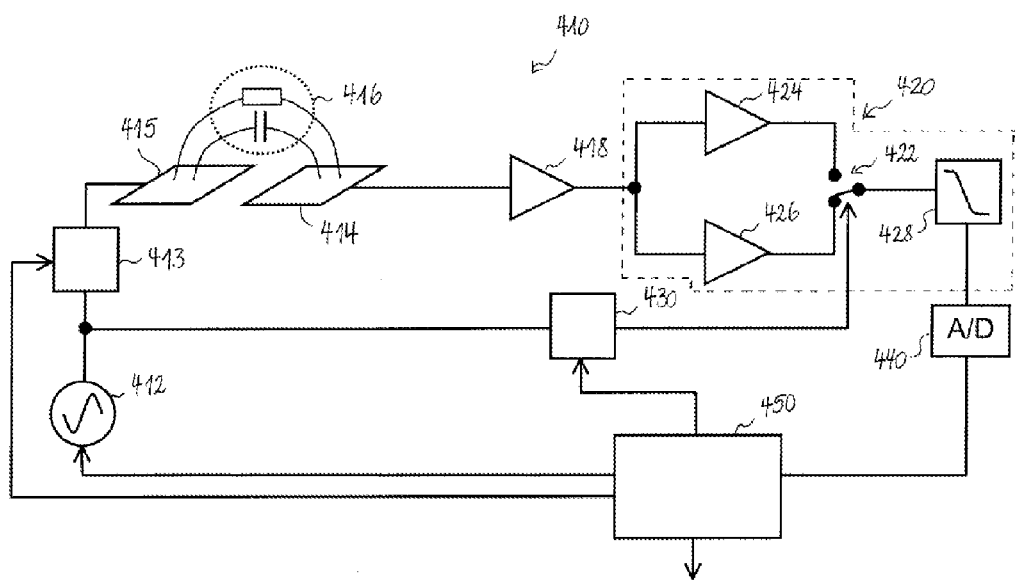
FIG. 6 is a simplified block diagram of the capacitive occupant detection system shown in FIG. 5.
Figure 7:
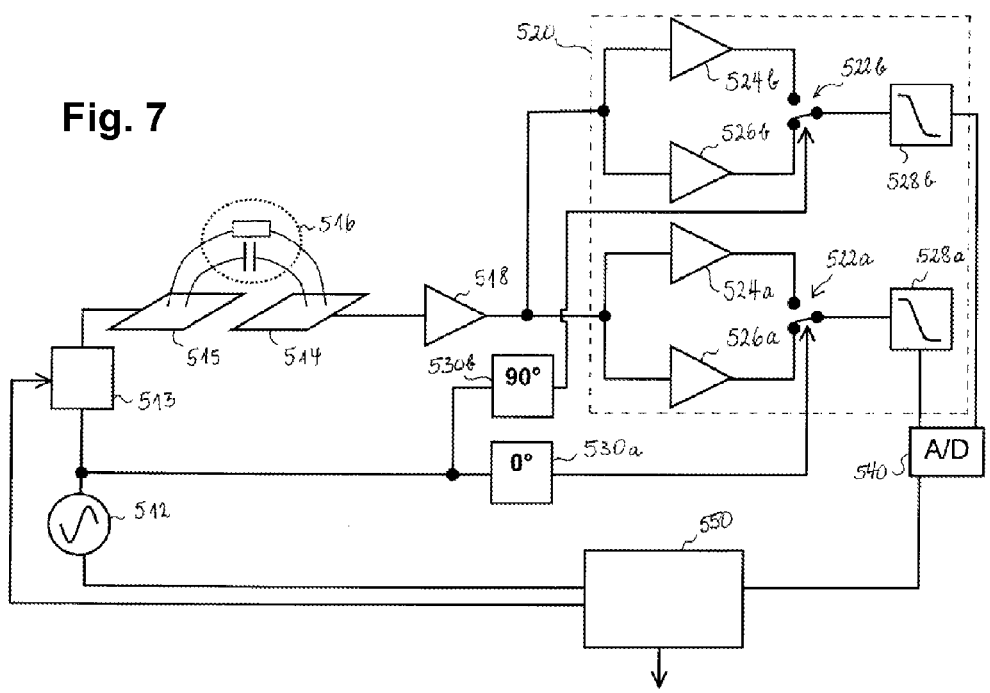
FIG. 7 is a simplified block diagram of a variant of the system of FIG. 6.

FIG. 5 schematically shows an automotive vehicle 460 with a car seat 462 equipped with a coupling-mode capacitive occupant detection system 410, variants of which are explained in more detail with respect to FIGS. 6 and 7. It will become apparent that operation of the coupling-mode systems is similar in most points to operation of the loading-mode systems discussed hereinbefore. The most important difference between a pure coupling mode system and a pure loading-mode system is that in the former the sine voltage signal $V_a$ is applied to a transmitting antenna electrode, whereas a current is measured on a sensing electrode different from the transmitting antenna electrode.

FIG. 6 shows a coupling-mode capacitive occupant detection system 410 according to a first variant thereof. A sine voltage signal generator (oscillator 412) applies an oscillating voltage signal $V_a$ of frequency f (selected in the range indicated above) to the transmitting antenna electrode 415, via amplitude adjustment stage 413. In response to the oscillating voltage signal $V_a$ being applied to antenna electrode 415, a current is caused to flow in sensing electrode 414, disposed in vicinity of the transmitting antenna electrode 415. The characteristics of this current depend on the impedance 416 between the electrodes 415 and 414. The impedance and the current allow drawing conclusions with respect to the presence or absence of objects or occupants in the region located between the electrodes 414 and 415. As in the loading-mode embodiments, the current flowing in the electrode 414 can be expressed as a sum of a first current component which is in phase with the oscillating voltage signal $V_a$ applied to the transmitting electrode 415 and a second current component which is 90°-phase-offset with respect to the oscillating voltage signal $V_a$ applied to the transmitting electrode 415.

Current-to-voltage converter 418, operatively connected to the sensing electrode 414 converts the current flowing therein into a converter voltage signal $V_c$. The converter voltage signal $V_c$ is fed to a clocked rectifier 420 that includes a switch 422, a first branch with an inverting amplifier 424, a second branch with a non-inverting amplifier 426 and a low-pass filter 428. The converter voltage signal $V_c$ is supplied to the inverting amplifier 424 and the non-inverting amplifier 426, in accordance with the binary signal provided by the control circuit 430. The gain of amplifier 424 is opposite to that of amplifier 426 (e.g. −1 and 1, respectively). Switch 422 combines the outputs of amplifiers 424 and 426 in alternance and feeds the combined signal (first or second intermediate voltage signal) to the low-pass filter 428. The latter is connected to analog-to digital converter 440, to which the low-passed signals are supplied. Analog-to-digital converter converts the low-passed signals into digital signals, which are sent to microprocessor 450. Since the system 410 operates essentially as the system of FIG. 1, the different acts performed by the various elements of the circuit are not repeated here and the reader is referred to the description of the embodiment of FIG. 1 for the details.

Amplitude adjustment stage 413, which is connected between the oscillator 412 and the transmitting antenna electrode 415. The amplitude adjustment stage 413 may be switched between two states. In interference detection mode, the microprocessor 450 keeps the amplitude adjustment stage 413 in a first state, wherein the latter adjusts the amplitude of the sine voltage signal to a first discrete value equal to 0 or close to 0. In occupant detection mode, microprocessor 450 keeps the amplitude adjustment stage 413 in a second state, wherein the latter adjusts the amplitude of the sine voltage signal to a second discrete value that is significantly higher than the first value. In both modes, the current measurement circuit operates in the same way, i.e. determines the current components $i_o \alpha$ and $i_o \beta$.

FIG. 7 shows a coupling mode capacitive occupant detection system 510 with an enhanced clocked rectifier 520. Oscillator 512 applies a sine voltage signal $V_a$ to the transmitting electrode 515 via amplitude adjustment stage 513. In response to the sine voltage signal $V_a$ being applied to electrode 515, a current is caused to flow in sensing electrode 514, disposed in vicinity of the transmitting electrode 515. The characteristics of this current depend on the impedance 516 between the electrodes 515 and 514. Current-to-voltage converter 518 converts the current flowing in the sensing electrode 514 into a converter voltage signal $V_c$ indicative of this current and thus of the impedance.

The converter voltage signal $V_c$ is fed to the enhanced clocked rectifier 520. The clocked rectifier 520 includes a first amplifier branch including an inverting amplifier 524a and a non-inverting amplifier 526a, of opposite gain factors, operatively connected to the current-to-voltage converter 518 and a first switch 522a alternately switching the inverting amplifier 524a and the non-inverting amplifier 526a to a first low-pass filter 528a. The enhanced clocked rectifier 520 further includes a second first amplifier branch including an inverting amplifier 524b and a non-inverting amplifier 526b, of opposite gain factors, operatively connected to the current-to-voltage converter 518 and a first switch 522b alternately switching the inverting amplifier 524b and the non-inverting amplifier 526b to a second low-pass filter 528a.

The control circuit 530a makes the switch 522a switch to the non-inverting amplifier 526a every time the oscillating voltage signal $V_a$ applied to the electrode is positive, i.e. first time intervals. $TI_1$ If the oscillating voltage $V_a$ applied to the electrode is negative, i.e. during the second time intervals $TI_2$, control circuit 530a makes the switch 522a switch to inverting amplifier 524a. The output signals of the amplifiers 524a and 526a are thus combined into an intermediate signal $V_{i1}$ (the "first" intermediate signal) and input to low-pass filter 528a. Low-pass filter 528a thus outputs a signal $V_{o1}$ indicative of the in-phase current component as an analog signal and feeds it to analog-to-digital converter 540.

The other control circuit 530b makes the switch 522b switch to the non-inverting amplifier 526b every time the oscillating voltage signal $V_a$ applied to the electrode is on a positive slope, i.e. during the third time intervals $TI_3$. If the oscillating voltage $V_a$ applied to the electrode is on a negative slope, i.e. during the fourth time intervals $TI_4$, control circuit 530b makes the switch 522b switch to inverting amplifier 524b. The output signals of the amplifiers 524b and 526b are thus combined into an intermediate signal $V_{i2}$ (the "second" intermediate signal) and input to low-pass filter 528b. The voltage signal $V_{o1}$ output in consequence by low-pass-filter 528b corresponds to a time-average of the second intermediate signal $V_{i2}$ and indicates the 90°-phase-offset component of the current. This analog signal indicative of the 90°-phase-offset component of the current is also fed to analog-to-digital converter 540. With respect to the control circuits 530a and 530b, it may be worthwhile noting that they may be implemented as shown in FIG. 10. In this case, the phase shifter associated with control circuit 530b provides a fixed 90° phase shift. The phase shifter associated with control circuit 530a provides a fixed zero phase shift, i.e. this phase shifter might be omitted.

Analog-to-digital converter 540 combines the signal $V_{o1}$ indicative of the in-phase current component and the signal $V_{o2}$ indicative of the 90°-phase-offset current component into a multiplexed digital signal including the information on both current components. Microprocessor 550 receives the multiplexed signal, extracts the relevant information and computes a decision as to which occupancy state it provides as output.

It should be noted that the use of a shielding electrode or electrodes is not excluded and is even considered advantageous in the embodiments that have not been specifically described having this feature.

In case the electrodes mentioned herein are to be integrated into a seat, they are preferably constructed from or incorporated into flexible material to provide seating comfort for the occupant. By way of example, the electrode could be composed of metal fibers sewn into a textile material (e.g. a textile layer of the seat) or conductive ink disposed on the surface of some substrate material, such as e.g. a dielectric film. Alternatively, the electrodes could be formed from a metal plate or foil.

It should be noted that in each one of the embodiments disclosed herein, elements individually described herein could be integrated into combined elements.

While specific embodiments have been described in detail, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

The invention claimed is:

1. A capacitive occupant detection system, comprising:
   an antenna electrode;
   a sine signal generator configured to generate a sine voltage signal, said sine signal generator being operatively coupled to said antenna electrode to apply said sine voltage signal to said antenna electrode, a current measurement circuit configured to measure current signals, said current signals comprising amplitude and phase of a current flowing in said antenna electrode or in a separate sensing electrode, or a first and a second current component of said current, with said first and second current components being out of phase with one another by a phase difference which is not 180° or an integer multiple thereof;

a control and evaluation unit operatively coupled to said current measurement circuit to determine an occupancy state based upon said measured current signals, and to output an output signal indicative of said occupancy state determined;

wherein said sine signal generator is operatively coupled to said antenna electrode via an amplitude adjustment stage, configured to adjust the amplitude of said sine voltage signal applied to said antenna electrode to an amplitude selected among at least two discrete amplitudes;

wherein said amplitude adjustment stage is operatively connected to said control and evaluation circuit; and wherein said control and evaluation circuit is configured to select one of said at least two discrete amplitudes at a time and to cause said amplitude adjustment stage to adjust the amplitude of said sine voltage signal applied to said antenna electrode to said selected amplitude; said control and evaluation circuit being configured to carry out an interference detection mode, said interference detection mode comprising measuring said current signals while a low one of said at least two discrete amplitudes is selected and determining whether said antenna electrode or said separate sensing electrode is exposed to interference, and an occupant detection mode, said occupant detection mode comprising measuring said current signals while a high one of said at least two discrete amplitudes is selected, determining said occupancy state based upon said current signals measured during said occupant detection mode and outputting said output signal indicative of said occupancy state determined.

2. The capacitive occupant detection system as claimed in claim 1, wherein said low one of said at least two discrete amplitudes amounts to at most 20% of said high one of said at least two discrete amplitudes.

3. The capacitive occupant detection system as claimed in claim 1, wherein said low one of said at least two discrete amplitudes is zero amplitude.

4. The capacitive occupant detection system as claimed in claim 1, wherein said sine signal generator is a digital sine signal generator, comprising a read-only memory chip having sine waveform samples digitally stored therein and a digital-to-analog converter operatively connected to said read-only memory chip to generate a stepped sine waveform from said sine waveform samples, and a filter configured to smooth said stepped sine waveform generated by said digital-to-analog converter.

5. The capacitive occupant detection system as claimed in claim 4, wherein said digital sine signal generator comprises a counter operatively coupled to said read-only memory chip to address said read-only memory chip and cause it to sequentially send said sine waveform samples to said digital-to-analog converter.

6. The capacitive occupant detection system as claimed in claim 5, wherein said digital sine signal generator comprises a clock signal generator operatively connected to said counter to provide said counter with a clock signal.

7. The capacitive occupant detection system as claimed in claim 5, wherein said control and evaluation unit is operatively connected to said digital sine signal generator to modify a counting rate of said counter.

8. The capacitive occupant detection system as claimed in claim 1, comprising a shielding electrode, wherein said sine signal generator is operatively coupled to said shielding electrode to apply said sine voltage signal to said shielding electrode in such a way as to maintain said shielding electrode at the same electric potential as said antenna electrode and to cancel an electric field between said antenna electrode and said shielding electrode.

9. The capacitive occupant detection system as claimed in claim 1, wherein said control and evaluation circuit is configured to carry out said interference detection mode and said occupant detection mode in a temporally interlaced manner, and wherein said control and evaluation circuit is configured to switch to a disturbed-operation mode when it determines that said antenna electrode is exposed to interference.

10. The capacitive occupant detection system as claimed in claim 9, wherein said control and evaluation circuit is configured to do at least one of the following while it is operating in said disturbed-operation mode:
 a. suspending said occupant detection mode;
 b. outputting an output signal indicative of a default occupancy state;
 c. outputting an output signal indicative of a most recently determined occupancy state;
 d. outputting an output signal indicative of the presence of interference;
 e. repeatedly carrying out said interference detection mode and exiting said disturbed-operation mode after it has been determined that said antenna electrode is no longer exposed to interference.

11. A car seat equipped with a capacitive occupant detection system as claimed in claim 1.

12. An automotive vehicle comprising one or more car seats as claimed in claim 11 and an occupant protection system responsive to said capacitive occupant detection system, such as e.g. a seat belt reminder and/or an airbag system.

13. Capacitive occupant detection method, comprising:
 generating a sine voltage signal and applying said sine voltage signal to an antenna electrode;
 measuring current signals, said current signals comprising amplitude and phase of a current flowing in said antenna electrode or in a separate sensing electrode, or a first and a second current component of said current, wherein said first current component is in phase with said sine voltage signal and said second current component is 90-degrees-phase-offset with respect to said sine voltage signal;
 determining an occupancy state based upon said measured current signals; and
outputting an output signal indicative of said occupancy state determined;
said method further including adjusting the amplitude of said sine voltage signal applied to said antenna electrode to an amplitude selected among at least two discrete amplitudes;
 wherein one of said at least two discrete amplitudes is selected at a time to carry out at least an interference detection mode and an occupant detection mode, respectively, said interference detection mode comprising measuring said current signals while a low one of said at least two discrete amplitudes is selected and determining whether said antenna electrode or said separate sensing electrode is exposed to interference, said occupant detection mode comprising measuring said current signals while a high one of said at least two discrete amplitudes is selected, determining said occupancy state based upon said current signals measured during said occupant detection mode and outputting said output signal indicative of said occupancy state determined.

14. Capacitive occupant detection method as claimed in claim 13, wherein said interference detection mode and said occupant detection mode are carried out in a temporally interlaced manner, and wherein a disturbed-operation mode is carried out when it is determined that said antenna electrode is exposed to interference.

15. The capacitive occupant detection system as claimed in claim 14, wherein, during said disturbed-operation mode, said method comprises at least one of the following:
   a. suspending said occupant detection mode;
   b. outputting an output signal indicative of a default occupancy state;
   c. outputting an output signal indicative of a most recently determined occupancy state;
   d. outputting an output signal indicative of the presence of interference;
   e. repeatedly carrying out said interference detection mode and exiting said disturbed-operation mode after it has been determined that said antenna electrode is no longer exposed to interference.

* * * * *